COLOUR TELEVISION CAMERA ARRANGEMENTS

Filed July 12, 1963 2 Sheets-Sheet 1

COLOUR TELEVISION CAMERA ARRANGEMENTS

Filed July 12, 1963 2 Sheets-Sheet 2

3,284,566

COLOUR TELEVISION CAMERA ARRANGEMENTS

Ivanhoe John Penfound James, Ealing, London, and Hans Gerhard Lubszynski, Waltham St. Lawrence, England, assignors to Electric & Musical Industries Limited, Hayes, Middlesex, England, a corporation of Great Britain Filed July 12, 1963, Ser. No. 298,517
Claims priority, application Great Britain, July 14, 1962, 27,150/62
9 Claims. (Cl. 178—5.4)

This invention relates to colour television camera arrangements.

Figure 1:
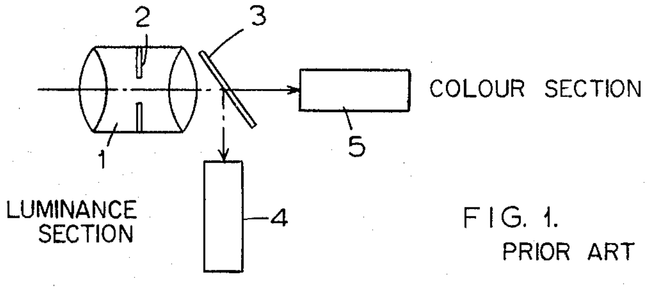

In most practical colour television cameras, it is necessary to divide the available light among a number of pick-up tubes, say three and the difficulty is often encountered of providing enough light for operation of the pick-up tubes. In FIGURE 1 of the accompanying drawings, an optical system, such as might be used in a colour television camera, is symbolically represented. This optical system contains a lens 1 which is shown as a two element lens with a variable aperture or iris diaphragm 2, and is followed by a beam-splitting dichroic filter 3, represented by a partially reflecting mirror. The mirror 3 diverts some of the light to a pick-up tube 4 which will be assumed to be that of which the signal output represents the green component of the scene being televised and has thus the highest luminance content. The beam-splitting mirror 3 passes the remainder of the light to the other pick-up tube or tubes of the camera represented diagrammatically by the block 5 giving output signals representing other colour components.

Cameras such as indicated encounter the problem that, because the incident light beam has to be divided among the various pick-up tubes, either a very high light level has to be used or the signal-to-noise ratio of the outputs of the pick-up tubes is less than desirable, or lag may be excessive. Thus in practice in order to obtain sufficient depth of focus from a camera such as that considered, it is usual to operate the iris diaphragm 2 so that a lens aperture of about $f/8$ or smaller is used when the photosensitive surface of the pick-up tube is approximately 41 mm. in diagonal, as would be the case if the pick-up tube were of image orthicon type. Even if a large aperture lens 1 is used, the need to obtain sufficient depth of focus has as a consequence the result that the outer part of the lens system is rarely used so that the amount of light available is restricted and when split between the pick-up tubes is relatively smaller than desirable.

The object of the present invention is to provide an improved colour television camera arrangement with a view to increasing the amount of light which, for a given scene illumination, can be made available for division among a plurality of pick-up tubes.

According to the present invention there is provided a colour television camera arrangement including a luminance pick-up tube for generating a signal representing the luminance of an object, at least one colour pick-up tube for generating a signal representing at least one colour component of said object, an optical system for applying light to said pick-up tubes, aperture means in the optical path to at least one of said pick-up tubes which cause the light reaching the luminance tube to be of a given aperture and the light reaching said colour pick-up tube to be obtained at least from light outside said given aperture.

The present invention is based on the consideration that if a camera arrangement having a separate luminance pick-up tube is adopted, only the luminance pick-up tube needs to be operated at an effective aperture corresponding to a required depth of focus, since the output signal of the luminance pick-up tube is mainly responsible for the sharpness of the reproduced picture. Each other pick-up tube in the camera can be operated with a greater effective aperture, so that in effect light rays of relatively "low quality" may be used, such as could not be applied to the luminance pick-up tube at least when substantial depth of focus is required. The application of low quality light rays to each colour pick-up tube will not impair the reproduced picture quality provided the resolution which is obtained in the colour component images formed at the targets of the colour pick-up tubes is consistent with the bandwidth allotted to the colour component signals, which is related, as is known, to the ability of the eye to resolve picture elements of the different colours. By virtue of the invention much more light can be made available for division among the various pick-up tubes so that adequate signal-to-noise ratio can be achieved in the output signals or so that lag can be reduced at relatively low light levels.

Figure 2:
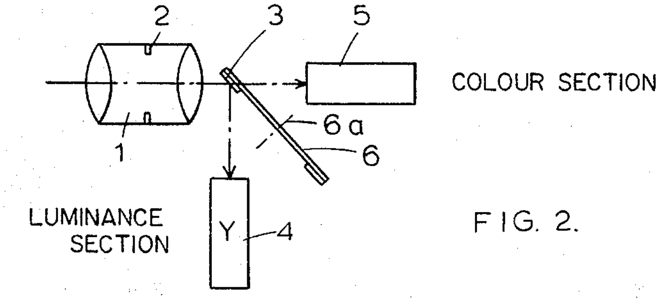
Figure 3:
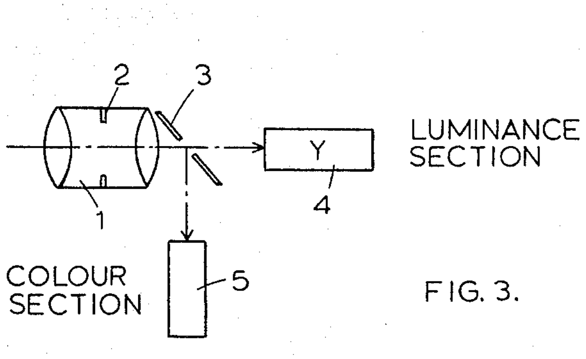
Figure 4:
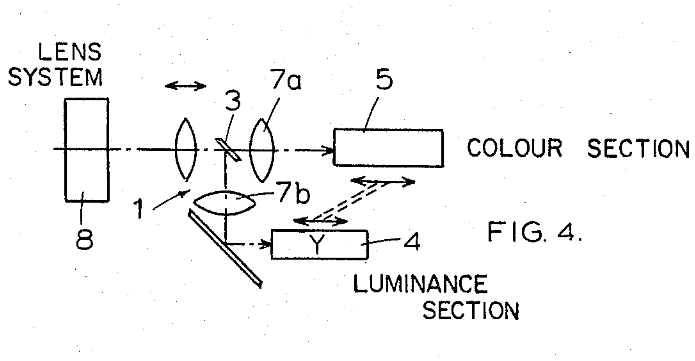
Figure 5:
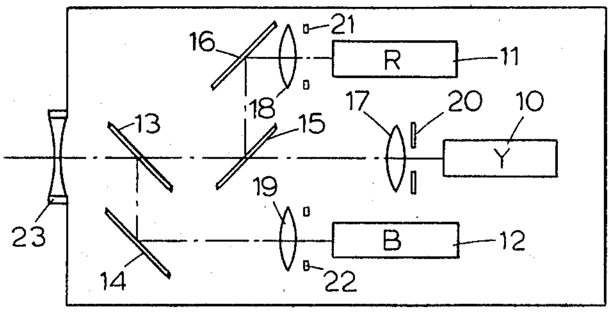
Figure 6:
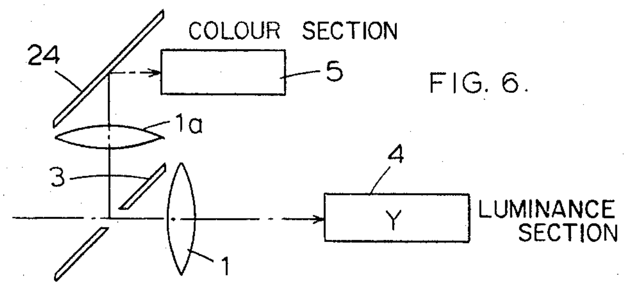
Figure 7:
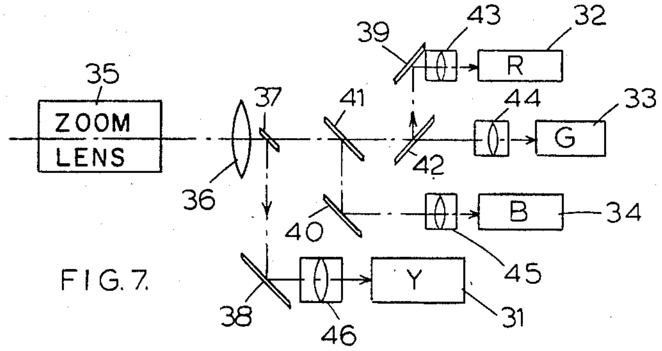
Figure 8:
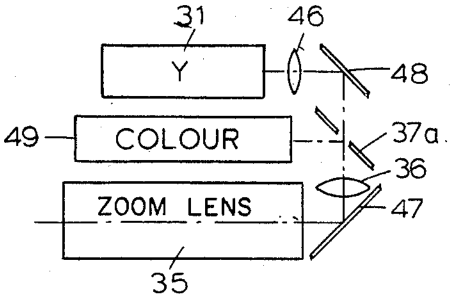

In order that the present invention may be clearly understood and readily carried into effect it will now be described with reference to the accompanying drawings, in which:

FIGURE 1 illustrates a conventional optical system for a colour television camera, as already described, FIGURE 2 illustrates a colour television camera arrangement according to one example of the present invention in which the various pick-up tubes have a common primary objective, FIGURE 3 illustrates a modification of FIGURE 2, FIGURE 4 illustrates another modification of the arrangement shown in FIGURE 2, FIGURE 5 illustrates a colour television camera arrangement according to another example of the invention in which separate objective lenses are used for the various pick-up tubes, FIGURE 6 illustrates yet another example of the invention, and FIGURES 7 and 8 illustrate other examples of the invention in which the invention is applied to a colour television camera with a zoom lens.

In the following description of the drawings, various components are shown symbolically, or by means of rectangles, since these components may be of constructions which are well known to those skilled in the art. The optical systems used in the camera arrangements according to the invention may also embody lenses and lens arrangements which are commonly used in colour television cameras and the description of the illustrated arrangements will therefore be confined mainly to those elements which are not conventionally constructed or arranged.

In FIGURE 2, the same symbols and references as were adopted in FIGURE 1 have been used to denote different components of the colour television camera. However in the case of FIGURE 2 the pick-up tube 4 is operated under such conditions that its output signal represents the luminance of the scene, as represented by the symbol Y inside the rectangle 4. Therefore the mirror 3 is required to apply some fraction of all colour components of the incident light to the target of the tube 4. The pick-up tubes in the part of the camera denoted by the reference 5 perform the colour analysis and this part of the camera is called the colour analysing section. The mirror 3 is a front surface mirror of small dimension placed just behind the lens 1 so that the light fed to the luminance tube is reflected by the surface of this small mirror. The dimensions of the mirror are approximately equivalent to the size of an $f/8$ aperture, so that the light fed into the luminance tube is gathered only from an axial zone of the objective lens 1 thereby ensuring the depth of focus required for the luminance detail in the reproduced picture, the tube 4 in this example being an image orthicon having a photo-sensitive surface of approximately 41 mm. diagonal. The objective lens 1 is, however, computed for operation with apertures up to about *f*/4 or higher and the normal iris 2 is operated at about this aperture. Light passing through the marginal zones of the objective can therefore pass to the colour section 5 of the camera. It is a known characteristic of colour vision that the colour information can be a lower order of resolution or definition than the luminance information and therefore, if by reason of the fact that the marginal zones of a relatively wide aperture objective are used to form the images on the targets of the colour pick-up tubes the resolution of the colour component images is relatively poor for parts of the scene which are not precisely in focus, this does not produce any noticeable deterioration of the reproduced picture.

For the purpose of comparison, assume that the optical system shown in FIGURE 1 operates with an aperture of *f*/8 and the mirror system 3 passes light to the tube 4 and the section 5 in the ratio $a:b$ where $a+b=1$, both being of course positive. Referring now to FIGURE 2, the objective lens 1 has an aperture of *f*/4, so that four times as much light is passed to the pick-up tubes as in the camera of FIGURE 1. Moreover, since the luminance tube operates with an unrestricted aperture at *f*/8, the amount of light passed to the tube 4 is increased by the factor $1/a$. Moreover, the remaining light passing to the colour section through the marginal zones of the lens is about three times that passing through an *f*/8 aperture and therefore the amount of light passed to the colour section 5 in the FIGURE 2 arrangement is increased, compared with FIGURE 1, by the factor $3/b$. It will thus be seen that the FIGURE 2 arrangement enables the camera to be used in conditions of lower scene illumination than the camera represented in FIGURE 1 or alternatively to give greatly enhanced results from the same amount of scene illumination. The effect of the mirror cancelling the central rays from the lens system may be used to reduce aberrations in the colour component images.

In the arrangement shown in FIGURE 2, the mirror 3 may be one of a number of mirrors of different sizes mounted on a disc 6 which can be rotated about the axis **6*a* so as to render the mirrors selectively effective in the optical path. In this way, the effective aperture for the luminance tube 4 can be adjusted. The iris diaphragm 2** and the disc could, in this case, be coupled for example by servo mechanism to keep the ratios of the lights in their separate paths constant despite a change of aperture.

In the modified arrangement shown in FIGURE 3, the front surface mirror 3 is used for reflecting light from marginal zones of the objective 1 to the colour section 5 of the camera. The mirror has, moreover, a central hole for permitting a beam restricted to light in an axial zone to pass to the luminance tube 4. The hole therefore acts as the defining aperture for the luminance tube.

The lens shown in FIGURES 2 and 3 is represented as being a simple objective but it could be a zoom lens having a variable angle of view, that is a variable magnification. In the modification of the invention shown in FIGURE 4, the front surface mirror 3, which is of the kind shown in FIGURE 2, is placed within the lens system 1 where the iris diaphragm would normally go. In this case, it is necessary to duplicate the rear elements of the lens 1, and these elements are denoted by the references **7*a* and 7*b*. In this form of the invention focussing can be achieved by moving the front lens relatively to the other lens or by moving the pick-up tubes as represented by the arrows. The lens system 1 may be part of a collimated system having in front of it a further optical system as indicated by the dotted rectangle 8**, which further system may for example, be a zoom lens or a transfer lens.

In the forms of the invention shown in FIGURES 2 and 4, the mirror 3 may be replaced by a prism and in the case of FIGURE 4 this prism may, for example, be secured on a thin glass diaphragm which is transverse to the light path. A further advantage of the arrangement of FIGURE 2 is that the light reflected from mirror or prism 3 is relatively non-polarised compared with that of the mirror 3 in FIGURE 1.

In the alternative form of the invention which is illustrated in FIGURE 5, three pick-up tubes of a colour television camera are denoted by the references 10, 11 and 12. The tube 10 is the luminance pick-up tube, its output signal thus representing the luminance Y of the scene. The tubes 11 and 12 are respectively "red" and "blue" tubes. The light splitting mirror system comprises the mirrors 13, 14, 15 and 16, the mirrors 13 and 15 being dichroic filters and 14 and 16 being front reflecting mirrors. The three tubes 10, 11 and 12 have individual objective lenses 17, 18 and 19 respectively and each of these lenses has its own iris diaphragm, their diaphragms being represented by the references 20, 21 and 22. The diaphragms are fitted with iris control devices which can be adjusted individually so that the red and blue lenses 18 and 19 can be operated at wider apertures than the lens 17. Moreover, it is possible to operate the red lens 18 at an aperture intermediate between that of the lenses 17 and 19, an arrangement having the advantage that the blue tube can obtain more light than would otherwise be the case whereby allowance can be made for the narrow spectral characteristic for the blue tube. Although the actual apertures are of different values it is arranged that a master iris control operates all three iris diaphragms in a "ganged" fashion so that their relative values are maintained. This ensures that the colour balance is kept constant irrespective of the position of the master control.

In the arrangement of FIGURE 5, since the tube 10 is a luminance pick-up tube the dichroic mirrors 13 and 15 are made to pass light (in the overlapping parts of the Y, R and B spectra) preferentially to the Y tube 10 rather than to the red and blue tubes 11 and 12. This is possible because the increased efficiency of the mirrors 13 and 15 as far as the tube 10 is concerned can then be compensated by operating the lenses 18 and 19 at wide apertures relative to the lens 17. The improved efficiency thus obtainable for the tube 10 is advantageous in reducing lag effects if the tube 10 has a photo-conductive target as in the type of tube known as the vidicon. In FIGURE 5 a supplementary lens is shown in front of the mirrors 13 and 15 to modify the angle of view. The lens 23 is shown as a negative lens to increase the angle of view. The supplementary lens may alternatively be a zoom lens in combination with a suitable transfer system. In a further alternative a number of supplementary lenses may be mounted on a lens turret.

FIGURE 6 shows an alternative to FIGURE 3 which may be convenient in some cases. According to this alternative, the mirror 3 having a central aperture is placed in front of the lens system. In this case separate lenses denoted as 1 and **1*a* are required for the luminance and colour sections of the camera and a further mirror 24 may be used as shown for deflecting the light from the lens 1*a* into the colour section 5**.

The pick-up tubes in colour television cameras according to the present invention need not be of the same types. For example another lens system may be disposed between the beam splitting means and the colour section of the camera so that the image is diminished in size to suit vidicon pick-up tubes, where the image transmitted to the luminance section of the camera is of a size appropriate to an image orthicon. For example, the luminance tube may be 4½" or 3" image orthicon whereas 1" or ½" vidicons may be used in the colour section.

Alternatively, a 1" vidicon may be used as the luminance tube and ½" vidicons as the colour tubes. Moreover it is possible to use mirrors in selected optical paths to the pick-up tubes which are of relatively curved form, for example concave or convex, so that the image going to the luminance tube is magnified or diminished relative to the colour images.

Various other modifications and additions may be made to the mirrors described. For example, focussing can be achieved by moving supplementary lenses in front of the main lenses, such lenses being, for example, mounted on a turret which may also carry supplementary lenses as already referred to for changing the angle of view. Moreover, the front surface mirrors which have been referred to may be of dichroic nature to improve the efficiency of the system.

In the various examples of the invention it may be desirable to prescribe the relative apertures for the luminance and colour tubes in which case variations of light levels may be allowed for by the use of gain controls or by neutral density wedges or the like. Alternatively, the relative apertures may be adjustable so as to maintain the ratio of colour-to-luminance energies constant in order that the colour saturation is maintained constant. The disc 6, in FIGURE 2, carrying the mirrors of different aperture can be replaced by a strip of transparent material on which mirrors of different aperture are mounted. This film may be of variable density to maintain a correct ratio of colour to luminance energies.

The invention may also be carried into effect by providing a small mirror, such as 3, between elements of a zoom lens.

Because the invention renders it possible for more light to be applied to the pick-up tubes of a colour television camera, the invention is especially applicable to cameras having four pick-up tubes, one of which is a luminance pick-up tube and the others of which are colour pick-up tubes for producing output signals representing components of the three primary colours of the television system.

The embodiment of the invention shown in FIGURE 7 is in the form of a four tube colour television camera, the camera incorporating an image orthicon tube 31 for producing a signal output representing the luminance of the scene, and three vidicon pick-up tubes 32, 33 and 34 which respectively produce signal outputs representing the red, green and blue components of the scene. The camera may, for example, be used with transmitting apparatus which transmits a video waveform including components denoted by the symbols $$Y^{1/\gamma},\ R^{1/\gamma}-Y^{1/\gamma},\ \text{and}\ B^{1/\gamma}-Y^{1/\gamma}$$

In practical forms of the camera represented in FIGURE 7 the three vidicon pick-up tubes 32, 33 and 34 may have their axes in a common horizontal plane and the image orthicon pick-up tube may be located above them. The axes of all the tubes are, however, represented as being in one common plane in the drawing. The camera has a zoom lens 35, for example of the kind known in the trade as the Varotal III, manufactured by Rank Taylor Hobson Division, Leicester, England of the Rank Organisation which lens 35 is followed by a transfer lens 36 with 8" focal length. The latter lens feeds the incident light into the mirrors system which comprises the reflecting mirrors 37, 38, 39 and 40, and dichroic mirrors 41 and 42. The mirror system directs the appropriate components of the incident light to the objective lenses 43, 44 and 45 of the respective vidicons, which lenses have focal lengths of 8 centimeters, and to the objective lens 46 of the image orthicon which is of 8" focal length. The different focal lengths of the lenses produce the images of the requisite sizes for the different tubes. The objective lenses are arranged to be focussed at infinity and the transfer lens 36 feeds them with collimated light which reduces phase effects, astigmatism ghost effects, and colour errors in the mirrors. The mirror 37 is a small miror corresponding to the mirror 3 in FIGURE 2 and as explained in connection with that figure it is such that only light rays from the central zone of the lens 36 are diverted to the image orthicon 31. On the other hand marginal rays are fed to the vidicons. In this form of the invention, the light intensity which can be produced at the target of the tubes 32 ,33 and 34 is such as to reduce lag to an acceptable level.

FIGURE 8 illustrates a modification of FIGURE 7 in which the optical system is folded to reduce the size of the camera. In this case, the light output of the zoom lens 35 is deflected through 90° by the mirror 47 before passing to the transfer lens 36. The small reflecting mirror 37 is in this case replaced by a larger mirror 37*a* having a central aperture so that the light for the vidicon tubes is reflected from the outer zones of this mirror. The light passing through the central aperture is reflected by a mirror 48 to the objective lens 46 of the image orthicon tube 41. The vidicon tubes are not individually represented in FIGURE 8, the colour analysing section of the camera being denoted by the rectangle bearing the general reference 49.

An alternative method of employing a zoom lens may also be used in accordance with the invention. Some types of zoom lens can be divided into two sections, the front section being the zoom part and the rear section being an imaging section to bring the image in focus with dimensions suitable for the size of the particular tube, alternative sections being obtainable for image orthicon size tubes and vidicon size tubes. In applying the invention to a zoom lens of this type, the small mirror equivalent to mirror 3 in FIGURE 2 or 3, can be arranged between the two sections, thus splitting the light efficiently.

The amount of light which may be applied to the pick-up tubes in arrangements according to the invention makes the employment of five pick-up tubes feasible and therefore it is feasible in accordance with the invention to provide a camera which will produce colour television signals according to one scanning standard (for example 625 lines) and a monochrome television signal according to another scanning standard (say 405 lines). In this case four tubes may be arranged in accordance with the various examples already illustrated to generate the colour television signal components whereas a fifth tube may be arranged to generate the separate monochrome signal, the fifth tube receiving light from further beam splitting means operating either before or after the mirror corresponding to 37 in FIGURE 7.

Two or more colour pick-up tubes and associated dichroic mirrors may if desired be replaced by a single tube having, in front, a colour filter in the form of a plurality of differently coloured strips perpendicular to the line scanning direction. Different colour component signals can be derived from the output of such a tube by known methods.

It will be moreover understood that this invention is not in any way restricted to the kinds of pick-up tubes which are used although the invention is especially advantageous to the arrangements in which the tube such as 31 has a photo-electrically emissive target and the colour pick-up tubes have photo-conductive targets. The so-called vidicons may moreover be replaced by tubes having lead oxide photo-conductive targets.

The expedient described with reference to FIGURE 5, whereby the blue pick-up tube is operated at a larger aperture than the green tube, can be applied to other forms of the invention. This permits the light input to the blue tube to be increased to compensate for inequalitites in colour filter efficiencies and thereby to tend to make lag components equal on grey scale.

Furthermore, a magenta filter (—G) may be placed around an outer annular zone of the entrance pupil of the camera arrangement.

What we claim is:

1. A colour television camera arrangement including a luminance pick-up tube for generating a signal representing the luminance of an object, at least one colour pick-up tube for generating a signal representing at least one colour component of said object, an optical system for applying light to said pick-up tubes, aperture means in the optical path to at least one of said pick-up tubes which cause the light reaching the luminance tube to be of a given aperture and the light reaching said colour pick-up tube to be obtained at least from light outside said given aperture.

2. An arrangement according to claim 1 in which there is disposed between said mirror arrangement and said luminance pick-up tube a first iris diaphragm and there is disposed between said mirror arrangement and said colour pick-up tube a second iris diaphragm, said second iris diaphragm providing a greater aperture than said first iris diaphragm.

3. An arrangement according to claim 1 which includes a mirror means for selecting a portion of the light for the luminance pick-up tube and for selecting another portion of the light for said colour pick-up tube.

4. An arrangement according to claim 3 in which said mirror means is constituted by a front surface reflector.

5. An arrangement according to claim 3 in which said mirror means is constituted by a totally internally reflecting prism.

6. An arrangement according to claim 3 in which said mirror means is located at a position where the rays in said optical system are substantially parallel.

7. An arrangement according to claim 3 in which said mirror means is of such dimensions that it determines the apertures for said pick-up tubes.

8. An arrangement according to claim 7 in which said mirror means is of such a size that it intercepts only the central portion of the light from said optical system and reflects it to the luminance pick-up tube, the remainder of the light being allowed to pass to said colour pick-up tube.

9. An arrangement according to claim 7 in which said mirror means is of annular shape the central portion of the light from said optical system passing through it to the luminance pick-up tube and the remainder of the light being reflected by said mirror means to said colour pick-up tube.

References Cited by the Examiner

UNITED STATES PATENTS

| | | | |
|---|---|---|---|
| 2,909,097 | 10/1959 | Alden et al. | 88—1 |
| 2,969,424 | 1/1961 | Tait | 178—5.4 |
| 3,196,205 | 7/1965 | Bedford | 178—5.4 |

DAVID G. REDINBAUGH, *Primary Examiner.*

J. A. O'BRIEN, *Assistant Examiner.*